(12) United States Patent
Nölle

(10) Patent No.: US 7,080,677 B2
(45) Date of Patent: Jul. 25, 2006

(54) MOTOR-VEHICLE CARGO-NET ASSEMBLY

(75) Inventor: Hans-Erich Nölle, Schwelm (DE)

(73) Assignee: Nolle-Pepin GmbH & Betriebs KG, Schwelm (DE)

( * ) Notice: Subject to any disclaimer, the term of this patent is extended or adjusted under 35 U.S.C. 154(b) by 118 days.

(21) Appl. No.: 10/491,234

(22) PCT Filed: Oct. 16, 2002

(86) PCT No.: PCT/EP02/11546

§ 371 (c)(1),
(2), (4) Date: Mar. 29, 2004

(87) PCT Pub. No.: WO03/037676

PCT Pub. Date: May 8, 2003

(65) Prior Publication Data

US 2004/0239136 A1 Dec. 2, 2004

(30) Foreign Application Priority Data

Oct. 26, 2001  (DE)  ........................ 201 17 369 U

(51) Int. Cl.
*B61D 45/00* (2006.01)

(52) U.S. Cl. ...................................... 160/329; 410/118

(58) Field of Classification Search ................ 160/329, 160/328, 378, 332; 296/24.43, 37.16; 410/117, 410/118, 129, 141; 220/1.5
See application file for complete search history.

(56) References Cited

U.S. PATENT DOCUMENTS

| | | | | |
|---|---|---|---|---|
| 3,099,313 A | * | 7/1963 | Peck et al. ................... | 410/118 |
| 3,169,781 A | * | 2/1965 | Abruzzino ................... | 280/749 |
| 5,340,004 A | * | 8/1994 | Moore ......................... | 224/563 |
| 5,452,973 A | * | 9/1995 | Arvin .......................... | 410/118 |
| 5,542,591 A | * | 8/1996 | Moore et al. ................ | 224/545 |
| 6,302,463 B1 | * | 10/2001 | Moore et al. ............. | 296/24.43 |
| 6,554,339 B1 | * | 4/2003 | Moore ...................... | 296/24.43 |

* cited by examiner

*Primary Examiner*—David Purol
(74) *Attorney, Agent, or Firm*—Andrew Wilford

(57) ABSTRACT

A cargo-net assembly suitable for mounting in a frame of a motor-vehicle door or seat has a net formed by a plurality of open meshes and having an outer edge and an inextensible cable having a pair of ends. The cable is threaded through the meshes along all but a predetermined section of the net edge between the cable ends. An elastic cord is threaded through the meshes along only the predetermined section and has ends juxtaposed with and secured by respective connectors to the respective cable ends.

4 Claims, 1 Drawing Sheet

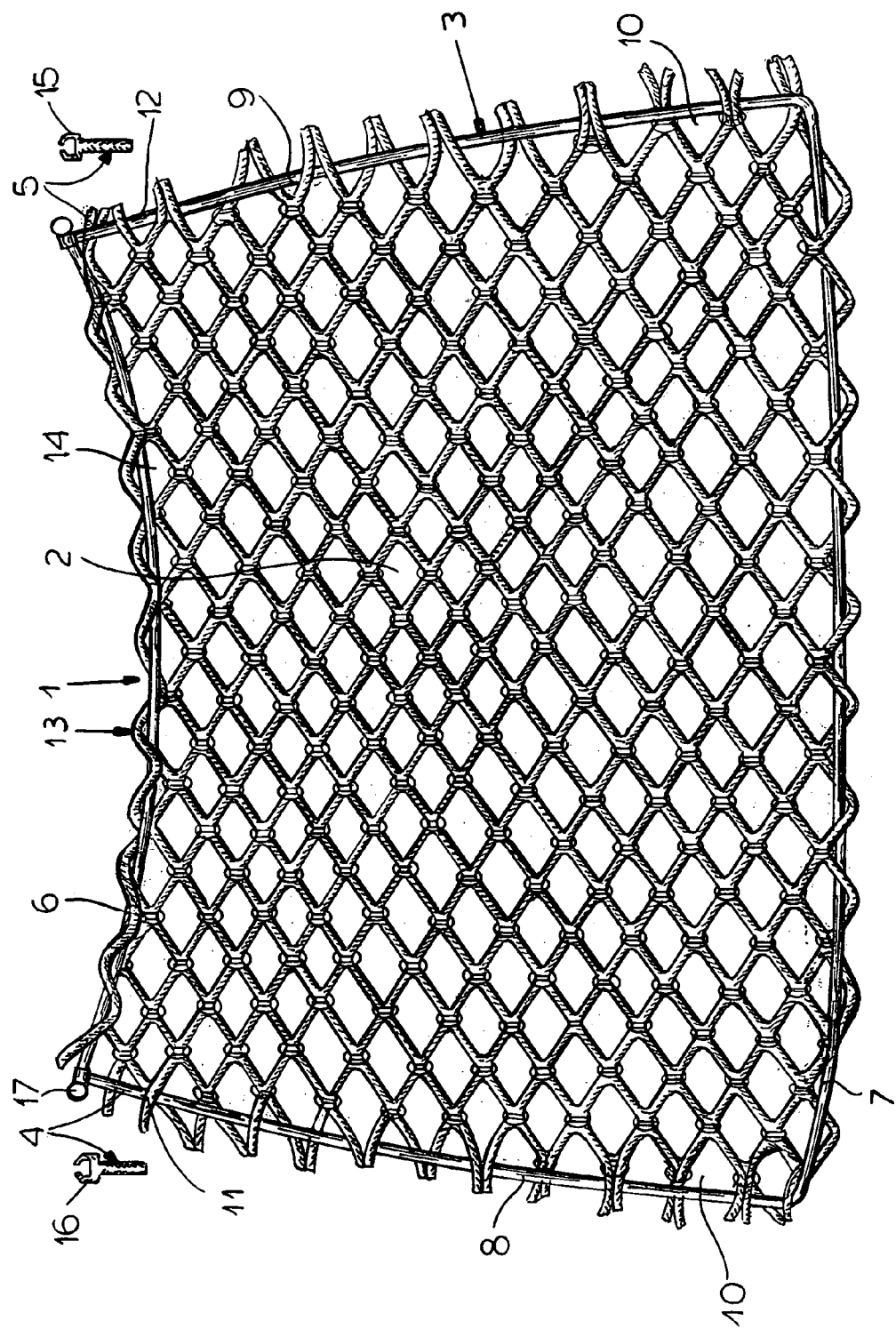

US 7,080,677 B2

MOTOR-VEHICLE CARGO-NET ASSEMBLY

CROSS REFERENCE TO RELATED APPLICATIONS

This application is the US national phase of PCT application PCT/EP02/11546, filed 16 Oct. 2002, published 8 May 2003 as WO 03/037676, and claiming the priority of German patent application 20117369.7 itself filed 26 Oct. 2001.

FIELD OF THE INVENTION

The present invention relates to a net arrangement for mounting in a frame, comprising a net, an inextensible cable that is threaded through all the edge meshes of the net except on one side, the configuration of the cable being adapted to that of the net, in addition to an elastic tension element or cord that is passed through the edge meshes of the cable-free side of the net.

Net assemblies of this kind are frequently components of retaining nets used on the inside surfaces of doors, seat backs or similar surfaces to hold all kinds of articles.

Known retaining nets with net assemblies of this kind require considerable installation outlays that, for reasons of economy, result in a number of unnecessary transport procedures.

OBJECT OF THE INVENTION

It is the object of the present invention to so develop a net assembly for mounting in a frame, of the type described in the introduction hereto, that the outlay incurred for the installation of a retaining net or the like that has a net assembly of this kind is greatly reduced.

SUMMARY OF THE INVENTION

According to the present invention, this objective has been achieved in that the net assembly is configured as a preassembled unit, the cable of which, together with its tension element or cord, can be inserted into the frame in order to install the net assembly in the frame. According to the present invention, the components that function directly with the net of the net assembly, together with the net, form the preassembled unit that can as such be installed in the frame of the future retaining net. This makes assembly a great deal simpler and results in a considerable reduction of the outlay needed for assembly of the future retaining net.

According to one advantageous configuration of the net assembly according to the present invention, the two ends of the cord are joined to the two unattached ends of the cable, this connection being most expediently realized by means of two connectors that are mounted on the two unattached ends of the cable, and with which the two unattached ends of the cord can be attached. The net assembly that is preassembled in this way can be assembled to the retaining net by making a connection between the ends of the cord and of the cable on the one hand, as well as corresponding receiving recesses, clip-on channels or the like that are provided on the frame.

Each connector is attached in a simple way to the unattached end of the cable that is associated with it, so as to be releasable therefrom, in that it has a cylindrical clip-on section or fitting with which it can be clipped or snapped onto the unattached end of the cable that is associated with it.

The connection between the connector and the end of the cord that is associated with it can be realized in a way that is less costly from the design standpoint if each connector has a clip-on section or fitting in which the end of the cable that is associated with it, which is provided with an end head, can be snapped.

Depending on the arrangement and configuration of the receiver recesses, clip-on channels, or the like, on the frame, assembly of the net arrangement described heretofore to the frame can be effected while maintaining the connection between the cord and the cable, or the two transition pieces can each be removed from the cord and from the cable, as a result of which the fixed connection between the cord and the cable can be released before the net assembly is installed.

According to another advantageous embodiment of the present invention, the cable has a bottom part and two arms that extend from the ends of the bottom part, the net being of a quadrilateral, trapezoidal, square or quadratic shape.

BRIEF DESCRIPTION OF THE DRAWING

The present invention will be described in greater detail below on the basis of one embodiment shown in the drawings appended hereto. In principle, the single drawing shows the net assembly according to the present invention for installation on a frame, the two connectors of the net assembly being shown as components of the assembly and—for purposes of greater clarification—as individual parts.

SPECIFIC DESCRIPTION

As shown in the drawing, the net assembly according to the present invention is a component part of a retaining net (not shown herein) that serves to hold articles of all kinds on the back of a seat, a door, or a similar surface. To this end, the retaining net has a frame (not shown herein) in which the net assembly 1 according to the present invention can be installed.

The net assembly 1 comprises a net 2, an inextensible cable 3, two connectors 4 and 5, and an elastic cord 6.

The net 2 is of a textile material that has a certain degree of elasticity and in the embodiment shown is of a more or less rectangular shape.

The cable 3 has a bottom section 7 and two side sections 8 and 9 that in the embodiment shown extend upward, more or less vertically, from the lower edge of the net 2, so that the cable 3 is configured in an approximate u-shape.

The bottom section 7 and the two side sections 8 and 9 of the cable 3 are threaded through edge meshes 10 along the sides of the net 2 that are juxtaposed with the bottom section 7 and the side sections 8 and 9.

Between upper ends 11 and 12 of the side sections 8 and 9 of the cable 3 there is a an upper edge 13 of the net 2 where there is no cable and the cord 6 is threaded through the edge meshes 14 of this cable-free side 13. The cord 6, which is most expediently of an elastic material, is joined by the two connectors 4, 5 to the ends 11 and 12 of the side sections 8 and 9 of the cable 3.

Each connector 4, 5 has a cylindrical plug-in fitting 15, by means of which the connectors 4, 5 can be attached to the respective ends 11 and 12 of the side sections 8 and 9 of the cable 3 so as to be releasable therefrom. Additionally, each connector 4, 5 has a snap-on fitting 16, into which caps 17 fitted on the ends of the elastic cord 6 can be snapped.

The preassembled net assembly 1 shown in the drawing can be realized very simply by snapping the cylindrical snap-on sections 15 of the connectors 4, 5, which are shown separately in the drawing, onto the ends 11 and 12 of the cable 3 that is already threaded through the associated edge meshes 10 of the net 2 and by snapping the caps 17 on the ends of the cable 6 into the snap-on fittings 16 of the two connectors 4 and 5. In order to assemble the retaining net that incorporates this net assembly 1, all that has to be done is to connect the cable 3 and the ends of the cord 6 with a retaining-net frame (not shown herein), this being provided with a suitable receiving recesses, clip-on channels, or the like, for this purpose.

The invention claimed is:

1. A cargo-net assembly comprising:
    a net formed by a plurality of open meshes and having an outer edge;
    an inextensible cable having a pair of ends, the cable being threaded through the meshes along all but a predetermined section of the net edge between the cable ends;
    an elastic cord threaded through the meshes along only the predetermined section and having ends juxtaposed with the cable ends; and
    respective connectors fixing each of the cord ends with the respective cable ends, whereby the cargo-net assembly can be mounted as a single unit in a frame of a motor vehicle.

2. The cargo-net assembly defined in claim 1 wherein each of the connectors forms a seat for the respective cable end and a seat for the respective cord end.

3. The cargo-net assembly defined in claim 2 wherein the cord ends are snap fitted into the respective seats.

4. The cargo-net assembly defined in claim 1 wherein the net is generally polygonal and has a plurality of sides one of which forms the section.

* * * * *